United States Patent
Miller et al.

[15] 3,663,256
[45] May 16, 1972

[54] MARK-FORMING RECORD MATERIAL

[72] Inventors: Robert E. Miller; Bruce W. Brockett, both of Dayton, Ohio

[73] Assignee: The National Cash Register Company, Dayton, Ohio

[22] Filed: May 26, 1969

[21] Appl. No.: 830,921

Related U.S. Application Data

[63] Continuation-in-part of Ser. No. 744,569, July 12, 1968, abandoned.

[52] U.S. Cl.............................117/36.2, 117/36.8, 117/155 L
[51] Int. Cl..............................................................B41m 5/22
[58] Field of Search................................117/36.2, 36.8, 36.9

[56] References Cited

UNITED STATES PATENTS

| | | |
|---|---|---|
| 3,244,549 | 4/1966 | Farnham et al.......................117/36.2 |
| 3,427,180 | 2/1969 | Phillips.................................117/36.2 |
| 3,455,721 | 7/1969 | Phillips et al. .........................117/36.2 |
| 3,466,185 | 9/1969 | Taylor...................................117/36.2 |
| 3,516,845 | 6/1970 | Brockett...............................117/36.2 |

*Primary Examiner*—Murray Katz
*Attorney*—Justin S. Compton

[57] ABSTRACT

This disclosure is directed to mark-forming record material containing two essential color-forming reactants which produce color upon contact with one another in the presence of a mutual liquid solvent wherein (A) one of said color-forming reactants is a phenolic resin containing at least 70 percent, by weight, of oil-soluble, amorphous, free-hydroxy-group-containing, room-temperature-solid, thermoplastic polymeric condensates of formaldehyde and at least one p-substituted phenol of which at least 10 percent, by weight, is a p-substituted phenol wherein the p-substituent is electron-attracting (for example, a p-halo-substituent), said polymeric condensates containing at least three p-substituted phenol units per molecule, and wherein (B) the other essential color-forming reactant is a basic chromogenic material; for example, Crystal Violet Lactone. The polymeric condensates of (A) may be a mixture of polymer chains, each polymer chain having three or more of the same or different recurring p-substituted phenol units per molecule with methylene bridges between adjacent p-substituted phenol units. Where the polymer resin of (A) is not entirely composed of condensates having recurring phenolic units bearing p-electron-attracting substituents, the remaining recurring phenolic units bear p-electron-donating substituents; for example, p-alkyl substituents.

A preferred form of mark-forming record material combines in the same polymeric resin, either in the same molecule or in a mixture of molecules, phenolic units bearing electron-attracting and -donating substituents; for example, a phenolic resin having p-halo groups as the electron-attracting substituents and p-alkyl groups as the electron donor substituents. By so blending electron-attracting and -donating groups, a "balanced" condensate (or mixture of condensates) having improved properties as a record material is achieved.

24 Claims, 4 Drawing Figures

INVENTOR
ROBERT E. MILLER &
BRUCE W. BROCKETT

BY E. Frank McKinny
Joseph P. Burke
HIS ATTORNEYS

IIa

III

IIIa

IV

INVENTOR
ROBERT E. MILLER &
BRUCE W. BROCKETT

FIG. 2 (Cont'd)

Va
 Vb
 Vc
 Vd
 VI
 VII
 XII
 VIII
 XIII
 IX
 XVI
 X
 XVII
 XI
 XIV
 XV

INVENTOR
ROBERT E. MILLER &
BRUCE W. BROCKETT

HIS ATTORNEYS

MARK-FORMING RECORD MATERIAL

This application is a continuation-in-part of the pending United States patent application of the same inventorship, Ser. No. 744,569, filed July 12, 1968, entitled "Compositions and Articles of Manufacture", now abandoned.

The present invention is directed to mark-forming record systems comprising a basic chromogenic material and a phenolic resin containing at least 70 percent, by weight, of oil-soluble, amorphous, free-hydroxy-group-containing, room-temperature solid, thermoplastic polymeric condensates of formaldehyde and at least one p-substituted phenol of which at least 10 percent, by weight, is a p-substituted phenol wherein the p-substituent is electron-attracting (for example, a p-halo-substituent), said polymeric condensates containing at least three recurring p-substituted phenol units per molecule. These resins and basic chromogenic materials react to form visible color marks. It has been found that the use of phenolic condensates wherein substantially all the p-substituted groups are electron-attracting yields a rapidly appearing mark of high intensity. While, for certain purposes, the rapidity and the intensity of the mark are critical, stability of the mark and the background over prolonged periods is essential for many applications of record systems. For these latter systems, it is preferable to combine electron-attracting and -donating groups in the phenolic condensate, phenolic resins having a balance of electron-accepting and -donating groups having a balance of electron-accepting and -donating groups being found to yield a mark having greater stability over time and with significantly less background yellowing. For example, a mixture of p-halo phenol, as the electron-attracting type, and a phenol having an electron-donating substituent in the para position, such as a p—$C_1$ to $C_{12}$-alkyl-substituted phenol, p-loweralkoxy phenol, and p-benzyl phenol, is reacted with formaldehyde to form useful polymeric condensates. Alternatively, each of the p-substituted phenolic types may be reacted with formaldehyde and the polymers produced therefrom combined. For the purposes of this disclosure, an electron-attracting p-substituent is defined as a p-substituent having a Hammett substituent constant greater than zero. A p-substituent having a Hammett substituent constant less than zero is considered to be electron-donating. For a discussion of Hammett substituent constants, see Hans Jaffé, *Chemical Reviews* 53 191 (1953).

More specifically, the polymeric condensates of this invention comprise polymer chains of three or more phenolic units linked with methylene groups, designated throughout the specification and the claims as "trimer plus" condensates, the upper limit of chain length being dictated by the need for the condensate to be oil-soluble. Condensates having a chain length of 12 phenolic units have been found useful. Preferably, however, the chain length should be from 3 to 6 phenolic units.

The formaldehyde content of said condensates ranges from about 0.65 to about 1.0 mole, and preferably from about 0.8 mole to 1.0 mole, of formaldehyde per mole of a mixture of (1) from about 1 to 5, and preferably 2.0 to 3.5 moles of para-electron-attracting-group-substituted phenol per mole of (2) para-electron-donating-group-substituted phenol. In all instances, at least 10 percent, by weight, of the para-substituted phenol condensate must be composed of para-electron-attracting-group-substituted phenol units.

The phenolic condensates comprise from 75 percent to 100 percent, by weight, of "trimer plus" (viz., trimer and higher) p-substituted phenol/formaldehyde polymeric condensates with the remaining 0 percent to 25 percent by weight being unreacted monomer(s) and dimer(s). Preferably, said phenolic condensates contain more than 80 percent, by weight, of said "trimer plus" polymeric condensates, as these materials are more readily soluble and lead to superior products compared to "dimer" p-substituted phenol/formaldehyde condensates, which are largely crystalline and do not readily dissolve in economical concentrations for such mark-forming products.

The term "oil-soluble" used herein to describe the polymeric condensates of this invention means that said condensates are soluble in water-immiscible organic solvents to give clear, stable solutions, which solvents are also solvents for the basic chromogenic material to the extent of the formation of solutions containing at least 0.25 percent, by weight, and usually more than 1.0 percent, by weight, of said basic chromogenic material.

It is essential to the present invention that the aforementioned condensates possess free or labile (reactable) hydroxyl groups in order to facilitate the formation of color upon complexing or association reaction of the aforementioned condensates with the basic chromogenic material. As used herein, "Reaction," "Color-forming reactants," and similar terms are used to denote the process of formation of color between the aforementioned condensates and the chromogenic material, including complex formation between said materials or any other association thereof whereby color is formed. While the present invention is not limited by theory, it is believed that the reason the colors are formed when the aforementioned condensates and the aforementioned basic chromogenic materials are brought together in the presence of a common solvent or oil (dissolving media) is that it is due to a formation of a complex between an acidic site of the aforementioned condensates and a basic site of the basic chromogenic material. Regardless of theory, the fact of the matter is that color is formed when the aforementioned acidic condensates are contacted with the basic chromogenic material in the presence of a common solvent.

The necessity for said polymeric condensates (and mixtures thereof with the hereinbelow-noted p-substituted-phenol/aldehyde condensates, said mixtures being "tailor-made" for incorporation and utilization in mark-forming record media) being substantially solid at normal-ambient room temperatures (viz., about 65° F. to about 80° F.) is to insure that a coating containing these polymers is "tack free" and essentially non-blocking under normal ambient conditions and that said condensates are sufficiently hard (non-plastic) to be capable of being ground readily into small particles without agglomerating due to the heat generated during grinding or equivalent comminution procedures.

The requirement for use of polymeric condensates which are thermoplastic in the mark-forming record media is to insure that the material remains permanently fusible and shows no tendency toward continued reaction, which would alter the solubility characteristics of the polymeric material in the mutual solvent.

The p-halo-phenol-containing condensates employed in this invention are formed readily by reacting the formaldehyde with the p-halo-phenol-containing mixture of p-substituted phenols at temperatures ranging from about 25° F. to about 212° F., using acid catalysis. Any conventional acid can be employed to catalyze the condensation, which proceeds readily in time periods ranging from 30 minutes to about 8 hours and is accompanied by the formation of water and volatile material. It is desirable to provide for removal of water; for example, by vacuum distillation. The water can be removed intermittently, substantially continuously as it is formed, or subsequent to condensation. Usually, the condensation is conducted at autogenous pressures and temperatures ranging from about 60° F. to about 212° F. for time periods of from about 30 minutes to about 4 hours. Suitable exemplary inorganic and organic acid catalysts which can be used to effect condensation include, but are not limited to, the following: hydrochloric acid, hydrobromic acid, sulfuric acid, phosphoric acid, oxalic acid, p-toluene sulfonic acid, etc.

Other phenolic condensates employed in this invention are made analogously to the p-halophenols discussed above by substituting the appropriate p-substituted phenol for the p-halophenol of that discussion.

Illustrative of phenols bearing p-electron-attracting substituents which can be used in making the novel polymeric condensates of this invention are the following:

p-fluoro-phenol, p-chloro-phenol, p-bromo-phenol, p-iodo-phenol, punitro-phenol, p-carboxy-phenol, p-carbalkoxy-phenols, p-acyl-phenols, and p-aroyl-phenols. Preferred among the above phenols is p-chloro-phenol because of its good performance, its availability, and its economy. It should be noted that the above-mentioned p-substituted phenols give condensates which are effective in rapidly developing intensely colored marks when contacted with basic chromogenic material. As pointed out above, this effectiveness is dependent on the condensates containing phenol units bearing p-electron-attracting substituents. Additional substituents (either electron-attracting or electron-donating) in one or both positions meta to the phenolic hydroxyl group are of little consequence; for instance, 3-methyl-4-nitrophenol performs about like p-nitrophenol, and 3,4-dichlorophenol and 3-methyl-4-chlorophenol both perform about like p-chlorophenol.

Illustrative of phenols bearing p-electron-donating substituents which can be used in making novel polymeric condensates (for use with the above-mentioned condensates derived from phenols bearing p-electron-attracting substituents) are the following: (1) p-loweralkoxy-phenol; (2) p-benzylphenol; and (3) any p—$C_1$- to $C_{12}$-alkylphenol such as p-methyl phenol, p-ethyl phenol, p-n-propyl phenol, p-iso-propyl phenol, p-n-butyl phenol, p-iso-butyl phenol, p-tertiary-butyl phenol, p-n-amyl phenol, p-iso-amyl phenol, p-1,1-dimethyl-n-propyl phenol, p-n- hexyl phenol, p-iso-hexyl phenol, p-1,1-dimethyl-n-butyl phenol, p-1,2-dimethyl-n-butyl phenol, p-cyclohexyl phenol, p-n-heptyl phenol, p-iso-heptyl phenol, p-5,5-dimethyl-n-amyl phenol, p-1,1-dimethyl-n-amyl phenol, p-n-octyl phenol, p-1,1,3,3-tetramethyl butyl phenol, p-iso-octyl phenol, p-n-nonyl phenol, p-iso-nonyl phenol, p-1,1,3,3-tetramethyl amyl phenol, 1-n-decyl phenol,p-iso-decyl phenol, p-n-undecyl phenol, p-iso-undecyl phenol, p-n-dodecyl phenol, and isomers of any of the above p—$C_1$- to $C_{12}$-alkyl- phenols, mixtures containing any two or more of the above-named p-alkylphenols, and isomers thereof. The addition of meta-substituents to the preceding p-substituted phenols is, again, of little consequence.

According to a preferred embodiment of this invention, the p-electron-donating-substituted phenol component is a p—$C_4$ to $C_{12}$-alkyl-substituent, and more preferably the p-alkyl substituent contains from eight to nine carbon atoms; and, as noted above, the p-electron-attracting-substituted phenol is p-chloro phenol. According to a preferred embodiment of this invention, the "trimer plus" polymer condensate referred to above is a result of the acid-catalyzed condensation of p-chloro phenol and a p-alkyl phenol composed chiefly of p-1,1,3,3-tetramethyl butyl phenol with formaldehyde in the above-noted molar concentrations.

In the general discussion that follows, phenols and phenolic condensates of the type bearing an electron-attracting substituent in the para position are illustrated in terms of the preferred p-halophenols and their condensates. It is to be understood that, where p-halophenols are said to be useful in this invention, other members of the group of p-electron-attracting-substituted phenols would also be useful.

A feature of the present invention resides in the use of "-tailor-made" polymer condensate blends comprising p-halophenol-containing "trimer plus" condensates and p-alkylphenol-containing "trimer plus" condensates to attain record systems having rapid and intense color-development of marks combined with permanency of mark and background colors. These "tailor-made" polymeric mixtures contain (A) the "-trimer plus" p-halo phenol/p—$C_1$ to $C_{12}$-alkyl-substituted phenol (and/or p-benzyl phenol and/or p-loweralkoxy phenol)- formaldehyde polymeric condensates described hereinabove in admixture with (B) at least one free hydroxyl-group-containing "trimer plus" condensate of (1) formaldehyde with (2) a material selected from the group consisting of (a) p—$C_1$ to $C_{12}$-alkyl-substituted phenol, (b) p-benzyl phenol, and (c) p-loweralkoxy phenol with the condensates (A) constituting from 10 percent to 35 percent, by weight, of said mixture, and the latter condensate (B) constituting from 65 percent to 90 percent, by weight, of said "tailor-made" mixture of "trimer plus" polymeric condensates.

The latter-mentioned condensate (B) is usually also formed by acid catalysis and in the same manner and under the same general conditions specified hereinabove with respect to the aforementioned condensates. Suitable p—$C_1$ to $C_{12}$-alkyl-substituted phenols which can be used to make said condensate (B) include any of the previously-mentioned p—$C_1$ to $C_{12}$-alkyl-substituted phenols referred to hereinabove in conjunction with those suitable for use in forming the aforementioned p-halo-phenol-containing condensates (A). In a similar manner, instead of using p-benzyl phenol or a single p—$C_1$ to $C_{12}$-alkyl-substituted phenol, mixtures of any two or more such materials, including a p-cycloalkyl phenol, may be reacted with formaldehyde. Moreover, the latter condensate component (B) of the "tailor-made" mixture can be composed of a plurality of "trimer plus" individual condensates of formaldehyde with p—$C_1$ to $C_{12}$-alkyl-substituted phenol, p-benzyl phenol, and p-loweralkoxy phenol, and the individual condensates constituting the condensate component (B) can have the same or different p—$C_1$ to $C_{12}$-alkyl-substituted phenol co-reactants. According to a preferred embodiment of this invention, the "tailor-made" mixture of condensates is composed of from about 20 percent to about 30 percent, by weight, of the aforementioned p-halo-phenol-containing condensate (A) and about 70 percent to about 80 percent, by weight, of said latter condensate (B; and at least one, and preferably the predominant (on a molar basis), p—$C_1$ to $C_{12}$-alkyl-substituted phenol of said latter condensate is p-t-butyl phenol. This "tailor-made" condensate mixture is preferable for mark-forming record media involving a predominant or complete use of paper fibers or webs.

As has been pointed out above, particularly effective and useful phenolic resin condensates, for the development of colored marks on paper by reaction with basic chromogenic materials, are those which consist partially of condensates having para-electron-attracting-group-substituted phenols and partially of condensates having para-electron-donating-group-substituted phenols. Useful phenolic condensates and condensate mixtures are set out in the Examples below, together with performance tests that demonstrate their relative utilities and properties. A procedure of use in establishing formulation guidelines is the titration of condensate candidates in benzene solution with non-aqueous base such as tetramethyl-guanidine to the ethyl bis(2,4-dinitrophenyl) acetate endpoint. Mixtures of condensates can be made at will to give titration values equivalent to the value obtained by titration of any standard phenol/formaldehyde condensate, selected for its desirable color-developing properties. Mixtures so tailored to the desired standard can be expected to perform similarly to the standard in developing color with basic chromogens on paper. Such titrations can therefore be used to give a number of condensate blends suitable for testing according to the product-oriented performance tests given in the Examples. p-Phenylphenol-formaldehyde resin (with a Hammett substituent constant of about zero for a p-phenyl substituent) was generally used as the titration standard for the blended resin condensates of this invention.

The aforementioned novel p-halo-phenol-containing condensates and "tailor-made" mixtures of condensates containing them yield a visible, strong color upon readily reactive (solution) contact with a basic chromogenic compound(s) and materials containing an adequate concentration of such compound(s). Usually, the chromogenic compound or material in the unreacted state is colorless, although light tones of color can be tolerated. However, the chromogenic material should be capable of color change to yield a strong distinctive color upon solution contact with the aforementioned p-halo-phenol-containing condensates and "tailor-made" condensate mixtures. These combinations of chromogenic material and the aforementioned condensates and "tailor-made" condensate mixtures can be employed in any of the known color-producing or mark-forming record media systems wherein the chromogenic material is basic and the complementary color-producing co-reactant is acidic. Thus, the invention will be illustrated and described below with regard to basic chromogenic materials. Examples of suitable basic chromogenic compounds having chromogenic groups are diarylphthalides, such as 3,3 bis(p-dimethylaminophenyl)-6-dimethylaminophthalide (Crystal Violet Lactone, hereinafter referred to as CVL) and 3,3-bis-(p-dimethylaminophenyl)-phthalide (Malachite Green Lactone, hereinafter referred to as MGL); leucauramines, such as the N-halophenyl-, particularly N-(2,5 dichlorophenyl)-leucauramine; acyl auramines, such as N-benzoyl-auramine, and N-acetyl-auramine; aryl auramines (for example, N-phenyl auramine); alpha, beta-unsaturated aryl ketones, such as dianisylidene-acetone, dibenzylidene-acetone, and anisylidene-acetone; basic monoazo dyes, such as p-dimethylamino azobenzene-o-carboxylic acid (Methyl Red), 4-aminoazobenzene (Oil Yellow AAB), and 4-phenylazo-1-naphthylamine; Rhodamine-B Lactams, such as N-(p-nitro-phenyl)- Rhodamine-B Lactam (hereinafter referred to as RBL); polyaryl carbinols, such as bis(p-dimethylaminophenyl)-methanol, called Michler's Hydrol, Crystal Violet Carbinol, and Malachite Green Carbinol; and 8'-methoxy-benzoindolinospiropyrans (hereinafter referred to as BIPS), such as 8'-methoxy-benzoindolinospiropyran, 4,7,8'-trimethoxy-benzoindolinospiropyran, and 6'-chloro-8'-methoxy-benzoindolinospiropyran, and p-dimethylaminostyryl-quinoline. Mixtures containing any two or more of the above basic chromogenic color-forming reactants can also be used as the basic chromogenic material.

It is essential to the attainment of the objectives of the present invention with respect to the mark-forming record media that both the p-halo-phenol-containing condensate (and including the "tailor-made" mixtures) and the basic chromogenic material be soluble in a mutual solvent. Thus, in effect, it is necessary that both said condensate (including "tailor-made" mixtures) and said basic chromogenic material possess common solubility in the oil or solvent media through which the color-forming reaction is effected by solution contact. A convenient and preferred way of insuring the presence of said solvent or oil is to encapsulate a solvent or oil solution of at least one of the color-forming reactants (for example, the basic chromogenic material) and to incorporate said capsules on or into the paper or other substrate or matrix, so that, when the solvent is released (for example, by the pressure used to form the mark), at least one of the color-forming components will already be substantially dissolved by said solvent or oil, thus promoting quicker color response. It is also within the purview of this invention to encapsulate, separately, solutions of both the chromogenic material and the co-reactant condensates; viz., encapsulate solutions of both color reactants, respectively. An alternative but somewhat less desirable procedure is to encapsulate the solvent only, so that, upon release, the solvent dissolves both color-forming reactants.

The capsules are in essence individual, substantially spherical containers composed of a seamless cell wall of substantially uniform thickness and an internal phase of said mutual solvent with or without one of the color-forming reactants. Of course, the capsule cell wall should be chosen of a material which is insoluble in the mutual solvent or solvent mixture confined therein. The specific capsule cell wall material employed will depend upon the specific liquid solvent or solvent mixture employed to effect the solution contact color-forming reaction. The liquid solvent must be capable of dissolving the color-forming reactants but not interfere with the color-forming reaction in a deleterious manner. For example, if a given solvent interferes with the color-forming reaction or diminishes color intensity of the mark, the solvent should be sufficiently volatile to assure its removal from the reaction site after it has brought the color-forming reactants into intimate admixture; viz., color-reaction-effecting solution contact. Usually, the solvent should be capable of dissolving at least 1.0 percent, by weight, of the basic chromogenic material and preferably at least 2 percent, by weight, thereof, and a corresponding concentration of the co-reactant aforementioned p-halo-phenol-containing condensates or "tailor-made" mixtures thereof. In preferred systems, the liquid solvent is capable of dissolving an excess of the polymeric condensate to provide every opportunity for utilization of the basic chromogenic material and thus secure maximum coloration at such reaction sites. For best results, the combination of mutual solvent(s) and color-forming reactants should be such that the solvent(s) dissolve the as yet undissolved color-forming component within about fifteen seconds from release of solvent from capsule. Suitable solvents include, but are not limited to, the following:

volatile and non-volatile hydrocarbons and halogenated hydrocarbons, solvents, and solvent mixtures, such as aryl and alkyl-substituted aryl hydrocarbons (for example, benzene, toluene, xylene, etc.); halogenated-aliphatic and mono or polycyclic aromatic hydrocarbons (for example, perchloroethylene) and chlorinated polyphenyls, such as chlorinated diphenyls, etc.; and aromatic and/or halogenated aromatic petroleum distillates (for example, low to medium boiling-point mixtures; that is, fractions boiling in the range of about 274° F. to 500° F., which are composed of a predominant weight concentration of aromatics and/or halogenated mono or polycyclic aromatic components but contain minor amounts of $C_5$ to $C_{20}$ paraffins in admixture therewith).

A wide variety of insoluble capsule cell wall materials can be used. Suitable encapsulating materials which can be employed include, but are not limited to, the following:

gelatin and gelatin-gum arabic coacervates with or without a hardening agent such as glutaraldehyde; cellulosic-type materials such as lower alkyl substituted celluloses (for example, methyl-cellulose); zein; polyvinyl alcohol; polyethylene imine; etc.

Encapsulation procedures suitable for forming the aforementioned capsules can be those of the so-called "en masse" (chemical procedures, such as, for example, as indicated in U.S. Pat. Nos. 2,800,457, issued July 23, 1957, on the application of Barrett K. Green and Lowell Schleicher, 2,800,458, issued July 23, 1957, on the application of Barrett K. Green, etc.; or the so-called mechanical or physical encapsulation procedures can be employed. Both the chemical encapsulation procedure and the physical encapsulation procedure are known. A detailed and comprehensive discussion of encapsulation procedures can be found in "Micro-Encapsulation" by Anderson et al. (Harvard M. B. A. Candidates' Report) published by Management Reports, Boston, Massachusetts (1963), the disclosure of which is incorporated herein by reference.

The individual capsules are in effect individual, seamless, substantially spherical containers which can range in size (diameter) from about 1 to about 300 microns. Usually, however, said capsules range in size from about 1 to about 100 microns and more usually from about 5 to about 50 microns, capsule diameters of about 5 to 15 microns being predominant in conjunction with paper record media. Clusters or aggregates of capsules can also be employed, and aggregates can have diameters varying widely, depending upon the number of capsules per cluster and the diameter of individual capsules. The capsules are dry to the touch, even though they contain a liquid payload of solvent. The employment of capsules greatly enhances the shelf life of the solvent and the chromogenic material contained in solution. The payload confined as the internal phase within the capsule cell wall can range anywhere from about 50 percent to about 90 percent, by weight, based on total weight of liquid solution and capsule cell wall. Usually, for most capsules employed in mark-forming paper recording media, the payload ranges from about 60 percent, by weight, to about 95 percent, by weight. It is also within the purview of this invention to encapsulate solutions containing the aforementioned p-halo-phenol-containing condensates (and "tailor-made" condensate mixtures); but this is by no means required, since the novel polymeric condensates and "tailor-made" mixtures containing them are very stable to exposure to normal ambient air and moisture conditions.

Suitable web or substrate materials for record media include, but are not limited to, paper sheets, layers, webs, and matrices; sheets, woven and non-woven webs and fabrics containing paper fibers in admixture with other materials (for example, natural and/or synthetic textile fibrous materials); and polymeric matrices, films, sheets, and layers.

The capsules containing the liquid solvent media, with or without one of the color-forming reactants dissolved therein, can be coated onto the substrate or web (paper, for example); or they can be incorporated therein during actual formation of the web or sheet in accordance with known procedures such as those disclosed in South African Pat. No. 63/231.

As noted previously, the solvent and both of the color-forming reactants can be present in the same paper sheet or web, and this type of mark-forming record medium can be accurately defined as self-contained, in that both the reactants and their means of effecting intimate admixture (solvent) are present in the same sheet or web. Of course, the solvent is confined by a plurality of insoluble discrete regions of confinement (for example, capsules), in order to insure that at least one of the two essential color-forming reactants (viz., aforementioned phenol condensates and basic chromogenic material) is denied solution-contact access to the other until the desired time for mark formation. Usually, in such articles, both the capsules containing the chromogenic solution and the p-halo-phenol-containing aforementioned condensates (or "tailor-made" condensate mixtures) are applied uniformly over the paper web or sheet, a profusion of uniformly distributed microcapsules or macrocapsules being present in intimate physical association with the aforementioned condensates on or within the paper substrate or matrix, respectively. The aforementioned "tailor-made" condensate mixtures can be coated or impregnated on the paper web by a variety of conventional coating or impregnating procedures; for example, solution coating, dispersion, or suspension coating. Also, it is within the purview of this invention to use inert or adjuvant active (non-essential) color reactant filler materials such as inorganic clays which both are acidic and possess the ability to react with the basic chromogenic material to likewise yield color. Also, the aforementioned condensates can be deposited upon the paper sheet or web by "dry" coating procedures well known to those skilled in the coating art. When dispersion or similar coating techniques are employed, usually the dispersion medium is water, or predominantly aqueous; and the aforementioned condensates and "tailor-made" condensate mixtures are finely ground or comminuted to a particle size convenient for application and uniform dispersion upon and/or incorporation within the paper substrate or matrix. Usually, the aforementioned condensates are ground or comminuted to a particle size ranging from about 0.1 micron to about 5 microns, a majority of the particles having a size less than 2 microns. According to a preferred embodiment of this invention, the particle size (diameter) of said aforementioned condensates ranges from about 2 microns and below. While the usual case is to uniformly deposit and/or incorporate said aforementioned condensates uniformly upon and/or within the paper substrate or matrix, it is also within the purview of this invention to conduct said incorporation or coating only upon certain areas or portions thereof, and the color reaction then proceeds only in said portions.

While even very small amounts of both essential color-forming reactants yield colored marks when brought into contact in the presence of an oil (solvent), the below-indicated ranges of color-forming reactants are employed in order to attain adequate color in mark-forming record media. The below-listed coating or incorporated concentrations are given in terms of pounds per ream of paper, where a ream is 500 sheets, each of which is 25 inches by 38 inches; viz., a ream is 475,000 square inches:

| Essential Color-forming Reactant | Permissive concentration Pounds/Ream | Usual concentration Pounds/Ream | Preferred concentration Pounds/Ream |
| --- | --- | --- | --- |
| A Encapsulated chromogenic material* | 0.02–0.08 | 0.02–0.075 | 0.03–0.06 |
| B Phenolic Resin containing at least 70%, by weight, "trimer plus" condensate | 0.075–2.5 | 0.10–1.0 | 0.30–0.80 |

*(Coating or incorporating concentration given in respect to the encapsulated chromogenic material, per se. The weight concentration of the encapsulated solution of active chromogenic material, including solvent and cell wall material, can range from 0.1 to 10.0 pounds/ream, usually ranges from 1 to 5 pounds/ream, and preferably ranges from 2 to 3 pounds/ream.)

The support member on which the components of the system are disposed can be a single or plural sheet assembly. In the case where all components are disposed on a single sheet, the record material is referred to as a "self-contained" system. Where there is a migration of the solvent, with or without mark-forming component, from one sheet to another, the record material is referred to as a "transfer" or "couplet" system.

According to a preferred embodiment of this invention, microcapsules are employed having a diameter of less than about 50 microns; for example, ranging from about 5 to 15 microns. Where microcapsules are employed, they can be present in the support material either disposed therethroughout or as a coating(s) thereon, or both. The capsules can be applied to the sheet material while the capsules are still dispersed in the liquid vehicle in which they were manufactured; or, if desired, they can be separated and the separated capsules thereafter dispersed in a solution of a polymeric component. This latter technique permits the preparation of a sensitive record coating in which the capsules are interspersed directly in a dry film of the polymeric material as it is laid down from the solution. A further alternative is to disperse in a liquid medium one or more mark-forming components, insoluble therein, and disperse in said medium the insoluble microcapsules, with the result that all components of the mark-forming system can be disposed on or within the support sheet in the one operation.

The arrangement and the physical state of the components of the mark-forming system in relation to support material will be further discussed hereafter, and specific arrangements are shown in the drawings.

In order to illustrate the invention further, embodiments thereof will now be described, by way of example, with reference to the accompanying drawings, in which:

FIG. 3 is a key for the various symbols used in FIGS. 1 and 2 to represent the mark-forming components. In accordance with this key, A represents solid chromogenic material particles, B represents p-halo-phenol-containing condensate (or "tailor-made" mixtures) polymeric material particles, C represents the confined or isolated liquid solvent, D represents chromogenic material dissolved in the isolated liquid solvent, E represents said polymeric material dissolved in the isolated liquid solvent, F represents paper and other fibrous substrates, and G represents a continuous polymeric coating of the aforementioned condensates (or "tailor-made" mixtures).

Figure 1:
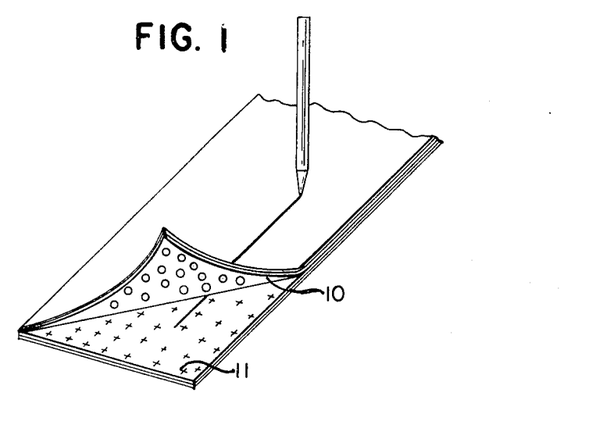
FIG. 1 is a highly diagrammatic representation of a transfer or "couplet" system.
Figure 1A:
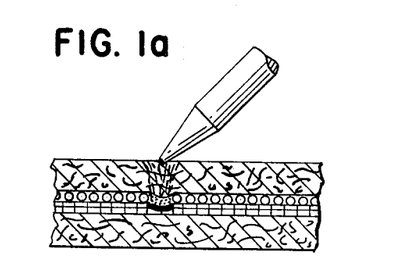
FIG. 1a is a highly diagrammatic cross-section of a portion of a transfer system being subjected to a stylus impression.

FIG. 1 shows a 2-sheet unit in perspective in which the underside of the oversheet 10 is supplied on the surface, or near it, with a profusion of minute pressure-rupturable microcapsules each containing a liquid droplet. The droplets are released on rupture of the capsules in data-representing configuration in printing or writing operations, as shown in FIG. 1a. The liquid of the released droplets is transferred in the pattern of the data configuration to the top of the undersheet 11, which is supplied with a material co-reactant with the received liquid to produce a distinctively colored mark corresponding to the configuration of the pressure pattern. In the drawing, the surface of the undersheet is marked with symbols (see FIG. 3) indicating the aforementioned p-halo-phenol-containing condensate color reactant polymeric material in film form, the aforementioned condensate or "tailor-made" condensate mixture having acid-reacting OH groups, and the capsules on the rear of the oversheet are marked with symbols indicating a contained liquid solution of chromogenic material; CVL or MGL, for instance. However, if desired, the capsules can contain the polymeric material in liquid solution, and the top surface of the undersheet may be supplied with the chromogenic material in particulate form. A representative number of structural arrangements of the several components with respect to support material are shown in FIG. 2, views I to XVII.

As noted generally above, these capsules can be applied to a support sheet from an aqueous slurry in which they were made, with an amount of aqueous vehicle material added or removed to give the slurry proper coating consistency. The slurry can have binder material added, if considered necessary. Paper coated with capsules of microscopic size and containing printing fluid, and the method of making them, are well known in the art.

In the instance where the mark-forming components are deposited on or interspersed throughout a single support sheet material (so-called self-contained unit), the following techniques or procedures have been found useful.

Figure 2:
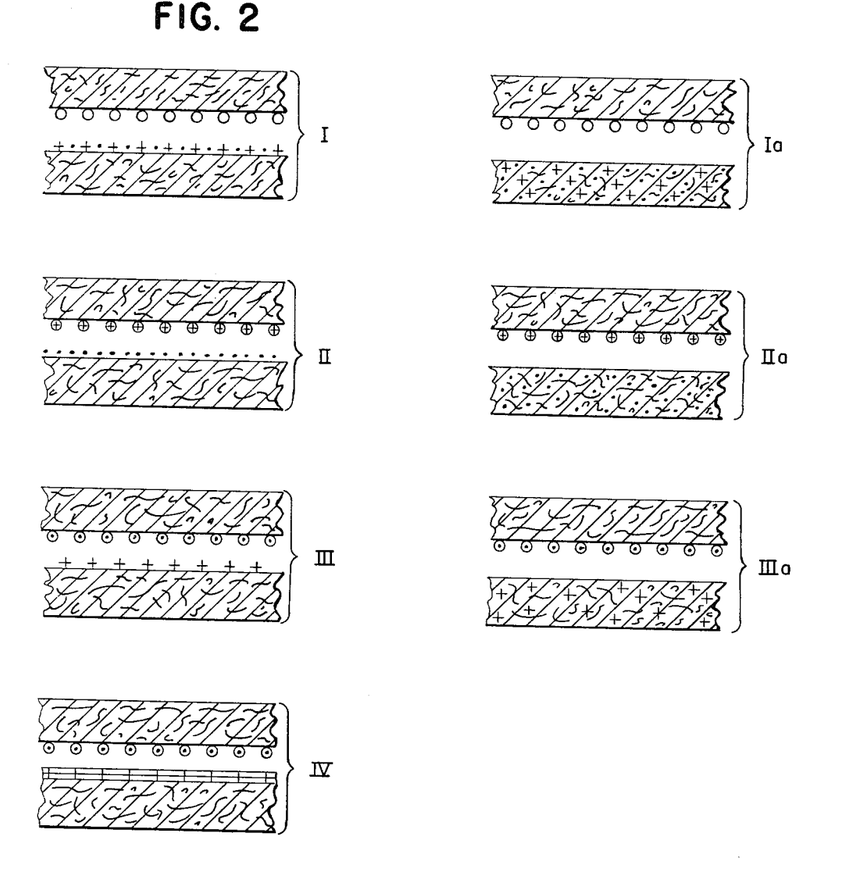
FIG. 2 is a representation, in a series of highly diagrammatic sections through various forms of self-contained record sheet units (views V–XV) and "couplet" units of two fibrous substrate (for example, paper) sheets (views I to IV, XVI, and XVII), showing the arrangement of the various components.
Figure 3:
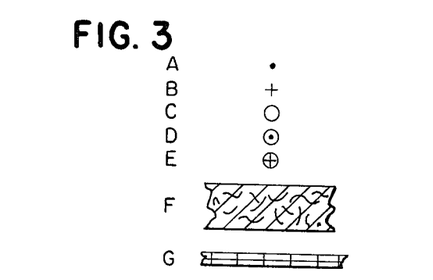

In FIG. 2, views Vb through Vd, where either the liquid solvent or one or more of the mark-forming components are disposed on the surface of the support member, and wherein the remaining components of the system are disposed within the support member, this structure can be achieved by supplying in the paper-making furnish going to the paper-making machine the component to be interspersed in the support sheet, then having the furnish pass onto the Fourdrinier wire. When the formed sheet is dry, the remaining necessary component or components can be coated thereon. In FIG. 2, views VII, IX, XIII, XIV, and XV, the various components are coated individually or simultaneously onto the support member. In FIG. 2, views VIII, X, XI, XII, and XVII, the several components are interspersed within the support sheet according to the technique outlined above for views Vb through Vd.

The slurry of capsules can be applied to a "wet" web of paper as it exists on the screen of a Fourdrinier paper machine, so as to sink into the paper web a distance depending on the freeness of the pulp and the water content of the web at the point of application.

The capsules can be placed directly in the paper pulp furnish before it is applied to the paper-machine screen, and thus appear throughout the thickness of a sheet (see FIG. 2, views VIII, X, XI, XIII, and XVII).

As the liquid content of these capsules of views VIII and XI, for instance, must make contact with the dry polymeric material component of the record unit of this type, the quantity of capsules, the quantity of retained liquid, and the availability of the liquid to make contact with the dry particles are details that are tailored to the desired construction and performance standards. The same criteria are observed wherever the liquid is situated or whatever it contains.

While the presence of confined solvent (oil) droplets or isolated solvent liquid is essential, such droplets need not necessarily be encapsulated except where the liquid solvent is provided as part of the furnish to the paper-making machine, as they may less preferably be confined or retained as a discontinuous emulsion droplet phase in a continuous film of pressure-rupturable material. Such film-holding of droplets that are released by writing or printing pressures is a well-known expedient, and such film is made by dispersing the oil droplets in a solution of polymeric film material which is applied to a record sheet and dried. The solvent liquid is more impermeably retained in the capsules, and they can be treated as particles (particulate solids) for incorporation into the paper-machine furnish. Thus, where the views of FIG. 2 show circles as the droplets on a support sheet, it means not only capsule structure but confining films which hold a multitude of droplets for local release in an area subject to pressure or equivalent methods of releasing the capsule contents.

View Ia of FIG. 2 shows the relative relation of mark-forming components disposed in a 2-sheet unit, wherein the sheet that receives the droplets incorporates solid particles of both components, which, being water-insoluble, can be incorporated in a paper sheet as it is being made. The confined solvent is applied to the under side of the oversheet as droplets in sufficient amount of penetrate among the paper fibers of the undersheet to dissolve the particulate color-forming components disposed there upon rupture of the solvent-insoluble confinements.

To make a dispersion of the aforementioned water-insoluble particulate condensate and "tailor-made" mixtures, a solution thereof in an evaporable solvent is introduced into twice as much water and agitated while the evaporable solvent is blown off by an air blast. This leaves an aqueous colloidal dispersion of said condensates, which can be applied to the paper so as to leave a surface residue; or the slurry can be applied to paper at the size-press station of a paper-making machine by roller. In another method of making a condensate polymer-sensitized sheet, said condensates are ground to the desired particle size in a ball mill with water, preferably with a dispersing agent, such as a small quantity of sodium silicate; or, if a binder material of hydrophilic properties is ground with said phenolic material, the binder itself can act as a dispersant. If desired, an amount of binder material up to 40 percent, by weight, of the employed amount of the polymeric material can be added to the ball-milled slurry of materials, such binder materials being of the paper-coating binder class including gum arabic, casein, hydroxyethylcellulose, and latex (such as of styrene-butadiene copolymer). If desired, oil sorbents in the form of fuller's earths, kaolin clays, and equivalent sorbents can be added to the polymeric material particles to assist in retaining, in situ, the liquid droplets to be transferred to it in data-representing configuration, for the purpose of preventing "bleeding" of the mark or print. The term "sorbents" as used herein is intended to include both adsorption and absorption.

Another way of applying the chromogenic material and p-halo-phenol-containing condensate(s) individually to a single sheet of paper is by immersing a sheet of paper in a 1 percent to 10 percent solution of the subject material in an evaporable solvent. Of course, this is done separately for each reactant because, if the other reactant material were present, it would result in a premature coloration over the sheet area. A dried sheet with one component then can be coated with a solution of the other component, the solvent of which is a non-solvent to the already supplied component. Of course, a sequential coating procedure can also be used in aqueous dispersion coating; for example, to place an overcoat of said polymeric condensate onto an encapsulated chromogenic solution previously deposited onto a paper substrate.

The polymeric material can be dissolved in ink composition vehicles to form a printing "ink" of colorless character and, thus, can be used to spot-print a proposed record sheet unit sensitized for recording in a reaction-produced color in those areas by application of a solution of the chromogenic material.

A printing ink can be made containing up to 75 percent, by weight, of said condensates in a petroleum solvent to a viscosity suitable for printing purposes.

In all the views, which in themselves constitute specific illustrative construction examples, it is to be understood that the showing is in exaggerated form, as the record materials in their manufactured form are hardly distinguishable to the naked eye from ordinary coated paper printing stock, the normal coloration after preparation being that of the base sheet stock. The sensitizing materials as to particle size, when particles are involved, are small enough to escape visual observation, but close enough to each other to afford a good recording surface or background surface against which the record can be visually sensed. The amounts of components to be used in coating or otherwise incorporating the color reactants and mutual solvent are the most convenient and economical amounts consistent with proper visibility of the recorded data. The resolution of the recorded data is, among other things, dependent on particle size, distribution and number of particles, liquid solvent migration, color-forming reaction efficiency, and other factors.

In the arrangement of material components of a multiple-sheet unit which requires one or more components to be on the back of an overlying sheet such as that shown in FIG. 2, views I to IV and XVI, when the co-reactant material is supplied on the otherwise uncoated back surface of the undersheet, it can serve as the middle sheet of a stack of three or more sheets to furnish another copy of the recorded data. Thus, if in FIG. 2, view I, the undersheet were coated on its back surface with solvent-containing capsules, it would transfer the released solvent for action with the top surface of a second undersheet, and so on. In this respect, the action between the back of the middle sheet and the sensitizing material of the second undersheet can be made different in response because of an intentionally made difference in the selection of component materials, or an intentionally made difference in the physical arrangement of the components between the back of the second sheet and the top of the third sheet according to the various embodiments of the invention shown in the drawings and disclosed in the specification.

The present invention will be illustrated in great detail in the following examples. These examples are included herein for illustrative purposes and should not be considered to limit the present invention. In the examples, all parts and concentrations are by weight, unless indicated otherwise.

EXAMPLE I (Preparation of typical p-halo phenol, p—$C_1$ to $C_{12}$ alkyl-substituted phenol-formaldehyde "trimer plus" condensate.)

In a reaction vessel (glass resin flask) are placed 196 grams of p-chloro phenol, 104 grams of p-1,1,3,3-tetramethyl butyl phenol, 130 grams of a 37%, by weight, commercial aqueous solution of formaldehyde (formaling), and 10 cubic centimeters of concentrated hydrochloric acid as the acid catalyst. The reactants are condensed at reflux temperatures in the resin flask for 4 hours at autogenous pressures. Then the resulting condensate is cooled, and the upper aqueous layer is removed. The condensate, which still contains water of reaction, is vacuum-distilled at temperatures of ambient to 392° F. at a water-aspirated partial vacuum to remove most of the remaining water and volatile materials. The condensate is then heated to approximately 392° F. (200° C.) and held at that temperature for 15 minutes, after which it is poured into a suitable receptacle, in which it is allowed to harden as the temperature gradually decreases to ambient room temperature.

Typical C, H, Cl, and O elemental analysis of a typical condensate indicates carbon (66.5 percent), hydrogen 5.8 percent), chlorine (16.2 percent), and oxygen (11.5 percent) versus a theoretical elemental analysis for condensate-tetramer of carbon (67.0 percent), hydrogen (5.9 percent), chlorine (16.9 percent), and oxygen (10.0 percent). Infra-red absorption patterns conducted on said condensate show an absorption in the 3,200 to 3,500 cm.$^{-1}$ region (which is indicative of free hydroxyl groups) and an absence of absorption in the 1,600 to 1,700 cm.$^{-1}$ region (which, if present, would indicate desensitization of the hydroxyl groups).

EXAMPLE 2

(Variation of p-halo and p-$C_1$ to $C_{12}$-alkyl-substituents)

| Run | Constituents | Mark Color Intensity |
|---|---|---|
| "A" | p-chloro phenol<br>p-1,1,3,3-tetramethyl butyl phenol<br>37%, by weight, aqueous solution of formaldehyde | 38 |
| "B" | p-fluoro phenol<br>p-1,1,3,3-tetramethyl butyl phenol<br>37%, by weight, aqueous solution of formaldehyde | 42 |
| "C" | p-bromo phenol<br>p-1,1,3,3-tetramethyl butyl phenol<br>37%, by weight, aqueous solution of formaldehyde | 43 |
| "D" | p-iodo phenol<br>p-1,1,3,3-tetramethyl butyl phenol<br>37%, by weight, aqueous solution of formaldehyde | 43 |
| "E" | p-chloro phenol<br>p-methyl phenol<br>37%, by weight, aqueous solution of formaldehyde | 38 |
| "F" | p-chloro phenol<br>p-tertiary-butyl phenol<br>37%, by weight, aqueous solution of formaldehyde | 41 |
| "G" | p-chloro phenol<br>p-dodecyl phenol<br>37%, by weight, aqueous solution of formaldehyde | 41 |

*The Color Intensity test is a comparative evaluation of the ability of each condensate to produce a blue color when contacted with a benzene solution containing 0.5%, by weight, of Crystal Violet Lactone. This test is conducted as follows: A 0.5%, by weight, solution of the resin to be tested is prepared using reagent grade benzene as the solvent. Filtration can be used, when necessary, to aid in obtaining a clear solution. A comparable 0.5%, by weight, solution of CVL in benzene is prepared, and 5 milliliters of the CVL solution is added to 100 milliliters of the condensate solution. The solutions are shaken thoroughly to obtain adequate contact of the color-forming co-reactants. Using a pipette, 3 drops of this solution is applied to circular white filter paper (for example, the commercially available "Blue Ribbon No. 589" having a diameter of 15 centimeters and marketed by Schleicher and Schuell) to form a colored spot having a size of approximately 1.25 to 1.5 inches. Five such spots are formed on each piece of filter paper. After allowing ten minutes for the solvent to evaporate and the colored spots to develop further, the reflectance of the colored spots and the white (background) paper are read in conventional manner using a Bausch and Lomb Opacimeter. The Color Intensity (per cent. reflectance ratio) is then calculated according to the evaluation: Color Intensity $$(\text{Percent reflectance ratio}) = \frac{\text{Reflectance of colored spot}}{\text{Reflectance of background}}$$

The values reported are the average of the five spots. The lower Color Intensity values indicate production of more intense blue color.

A variety of water-insoluble, solvent-soluble, p-halo phenol/p—$C_1$ to $C_{12}$-alkyl-substituted phenol-formaldehyde condensates were prepared having the above-tabulated constituents, using a 2-piece, 200-milliliter resin pot whose cover has four openings (one for reflux condenser, one for stirrer, one for addition of reactants, and a thermometer well). Heat was supplied by a glass fiber electrical heater fitted around the bottom portion of the pot. The condensates were made and recovered using the following typical procedure for each run. The p-halo phenol (0.3 mole) and the p-alkyl phenol (0.1 mole) were charged to the reaction vessel in a mole ratio of 3:1, respectively, and heated into liquid form. Formaldehyde (sufficient 37 percent aqueous formaldehyde to provide 0.32 mole formaldehyde), acid catalyst (from 2.5 to 4 milliliters of concentrated hydrochloric acid), and water (approximately 10 milliliters) were then added to the molten phenols (mole ratio of formaldehyde to total substituted phenols; viz., p-halo plus p-alkyl, of 0.8:1), and the pot temperature was raised until the vapor line was at the bottom of the reflux condenser. The reaction mixture was stirred and held at reflux for 3 to 4 hours. Agitation was then stopped, and the reaction mixture was allowed to settle and separate into two layers. The upper aqueous layer was decanted off. The reflux condenser was removed, and the reaction vessel was equipped for distillation to remove water and other volatile materials from the condensate. As the water, etc., was removed, the pot temperature was increased gradually to from 120° to 150°C. (248° to 302° F.)

and higher, as required, until no further evidence of water removal was observed. The condensate was then poured into suitable receptacles (for example, aluminum trays) for cooling at ambient room temperatures (viz., about 65° to 75° F.), to yield hard and brittle thermoplastic material.

The condensate preparation and isolation procedure used in Run "C" employed an additional purification step. After being poured from the reaction vessel, the condensate was allowed to harden and then was ground to a fine powder, using mortar and pestle. The ground condensate was then dispersed in 500 milliliters of water and extracted from the water with 100 milliliters of benzene. The benzene layer was then extracted in turn 2 additional times with from 200 to 300 milliliters of water. The benzene was finally evaporated off by drying at room temperature under reduced pressure in a vacuum separator to yield a solid condensate.

The condensates of each of Runs "A" through "G" produce an immediate blue coloration when contacted with a benzene solution of CVL. Each such condensate likewise produces an immediate blue mark when normal marking pressure is applied to a pair of paper sheets, one coated on the top (front) surface (referred to as a CF or receiving sheet) with said condensates and arranged with its condensate-coated surface beneath and in contiguous relationship with another piece of paper having its back (bottom) surface coated (CB sheet) with gelatin capsules containing a benzene solution of CVL, the marking pressure being applied to the upper surface of the CB sheet, as, for example, by a stylus, a pen, a pencil, a typewriter character, or other equivalent pressure marking device.

A variety of "trimer plus" p-halo-phenol-containing condensates with formaldehyde were prepared in accordance with the acid-catalyzed condensation procedure given above in Example 2, using concentrated hydrochloric acid as catalyst, an aqueous solution containing 36 percent, by weight, formaldehyde, and the p-substituted phenols as tabulated above, In Runs "A" "E," the mole ratio of p-halo-phenol to p—$C_1$ to $C_{12}$-alkyl-substituted phenol was varied from all p-halo-phenol, Run "A," to equimolar amounts of both types of substituted phenol components, Run "E," while maintaining the mole ratio of formaldehyde to total substituted phenol constant.

The condensates were then tested for Mark Color Intensity (as in Example 2) and evaluated for acceptability for use in paper record media from a practical viewpoint with regard to resistance of the mark to fading when exposed for two weeks to ambient temperatures, humidity, and oxidative influences (air). Color Intensity values of 33 to 43 are considered acceptable.

to total p-substituted phenols was varied to determine the effect on mark color intensity. As will be noted from the above table, use of condensates having formaldehyde to total p-substituted phenol mole ratios of greater than 1:1 (for example, Run "E") results in production of inadequate color for uses involving paper record media.

Additionally, it has been determined that use of too little formaldehyde (viz., less than approximately 0.65 mole of formaldehyde per mole of total p-substituted phenol) likewise results in inadequate color production (viz., diminished reactivity of the resulting condensates with the basic chromogenic compounds). Use of insufficient formaldehyde also causes processing difficulties in preparation of condensate coatings when applied by conventional aqueous dispersion coating techniques, especially with regard to grinding the condensates and loss of some condensate due to water solubility.

EXAMPLE 5

Color Intensity Test Results demonstrating the effectiveness of "trimer plus" phenol/formaldehyde condensate having various para-electron-attracting-group-substituted phenol units present follow. p-Halophenol resins (meta-unsubstituted) also representative of this group are treated in other Examples.

EXAMPLE 3

| Run | Substituted phenol constituent(s) | Mole ratio of p-halo phenol to p-$C_1$ to $C_{12}$ alkyl phenol | Mole ratio of formaldehyde to p-substituted phenol(s) | Mark color intensity | Acceptability of mark fading resistance |
|-----|-----------------------------------|-----|-----|----|-----|
| A   | p-Chloro phenol                   |     | 0.8:1 | 38 | Yes. |
| B   | p-Chloro phenol plus p-1,1,3,3-tetramethyl butyl phenol. | 5:1 | 0.8:1 | 37 | Yes. |
| C   | do                                | 3:1 | 0.8:1 | 38 | Yes. |
| D   | do                                | 2:1 | 0.8:1 | 37 | Yes. |
| E   | do                                | 1:1 | 0.8:1 | 42 | Yes. |

| Substituted Phenol Constituent(s) | Mark Color Intensity |
|---|---|
| 3,4-dichlorophenol | 34.4 |
| 3,4-dichlorophenol plus p-octylphenol (mole ratio 1:1) | 41.5 |
| propyl p-hydroxybenzoate plus p-octylphenol (mole ratio 3:1) | 50.7 |
| p-hydroxybenzophenone | 55.4 |
| p-hydroxybenzophenone plus p-octylphenol (mole ratio 1:1) | 54.3 |
| 3-methyl-4-nitrophenol plus p-octylphenol (mole ratio 2:1) | 39.9 |
| 3-methyl-4-nitrophenol plus p-octylphenol (mole ratio 1:2) | 45.9 |
| p-hydroxypropiophenone plus p-octylphenol (mole ratio 2:1) | 53.1 |

The mole ratio of formaldehyde to p-substituted phenol(s) was 0.8:1 in all the above resins.

For the purpose of comparison, "trimer plus" condensates prepared with formaldehyde and various para-electron-donating-group-substituted phenols (with the same 0.8:1 formaldehyde/phenol ratio) gave the following Mark Color Intensities: p-nonylphenol resin, 65.9; p-amylphenol resin, 67.5; p-octylphenol resin, 58.7; and p-cyclohexylphenol resin, 64.9. The standard p-phenylphenol resin, identically prepared, gave a Mark Color Intensity value of 45.1.

EXAMPLE 4

| Run | Substituted phenol constituent(s) | Mole ratio of p-halo phenol to p-$C_1$ to $C_{12}$-alkyl phenol | Mole ratio of formaldehyde to p-substituted phenol(s) | Mark color intensity |
|-----|-----|-----|-----|-----|
| A | p-Chloro phenol plus 1,1,3,3-tetramethyl butyl phenol. | 3:1 | 0.65:1 | 34 |
| B | do | 3:1 | 0.7:1 | 41 |
| C | do | 3:1 | 0.8:1 | 38 |
| D | do | 3:1 | 1:1 | 40.0 |
| E | do | 3:1 | 1.2:1 | 45 |

A series of "trimer plus" p-halo phenol-p-octyl phenol-formaldehyde condensates were prepared in accordance with Example 2. The mole ratio of p-halo phenol to p-alkyl phenol was maintained constant, and the mole ratio of formaldehyde

EXAMPLE 6

Typical Formation of Transfer Mark-Forming Products (for example, as shown in FIG. 1) using paper record media and a variety of "trimer plus" p-halo-phenol-containing condensates and "tailor-made" mixtures.

The below-tabulated color-forming condensates and condensate mixtures were prepared having the indicated constituents in the noted molar proportions by acid-catalyzed condensation as indicated above in Example 2. In all cases, the co-condensate was formaldehyde in aqueous form (37 percent, by weight, formaldehyde). Mixtures of condensates were made by separately condensing the respective condensates and mixing them prior to the grinding and other coating formulation steps. The overall procedure involved four main stages: condensate preparation (and mixing, where applicable); grinding of condensates; formulation of aqueous coating dispersion; and coating. The below typical grinding, formulation, and coating procedures are given in terms of preparation of a coating containing 17 percent, by weight, condensate(s). However, it will be understood that the coatings containing less condensate employ the tabulated concentrations of materials.

The condensate is ground by charging 1,700 grams of condensate plus 1,700 grams of water plus 204 grams of a 25 percent, by weight, aqueous solution of Tamol 731 dispersant (commercially available sodium salt of condensed sulfonated organic acid) to a 2-gallon attritor about two thirds filled with ⅛-inch-diameter stainless steel balls, and grinding at approximately 180 revolutions per minute for 75 to 90 minutes.

The coating formulation is then prepared by dispersing 5,500 grams of kaolin clay, 900 to 1,200 grams of calcium carbonate, and optionally 300 grams of Syloid 72 (commercially available silica gel) in approximately 6,000 grams of water with a Cowles Dissolver or other suitable high-speed agitator. Dispersing agents, such as tetrasodium phosphate, can be used in conventional amounts to facilitate development of a smooth, lump-free dispersion coating as desired. When the above components are dispersed satisfactorily, 4,240 grams of the above ground condensate is added thereto. Then 4,750 grams of a 20 percent (solids) aqueous dispersion of Penford Gum 260 (commercially available, medium viscosity hydroxyethyl corn starch ethers) is added, with stirring, along with 1,300 grams of a 50 percent (solids) commercially available carboxylated styrene-butadiene latex (Dow Latex 620). The coating formulation is then screened through a 100-mesh screen prior to use.

The above formulated, screened coating formulations are then applied to conventional white bond paper record media (for example, 80 percent, by weight, Kraft fibers and 20 percent, by weight, sulfite fibers) having a basis weight of about 33 pounds per ream, using approximately four pounds of coating formulation per ream of paper (500 sheets per ream, each sheet being 25 inches by 38 inches). The coating can be applied by any of the conventional procedures; for example, roll coating, trailing-blade application or air knife application using aqueous coating dispersions having the following solids contents:

| | |
|---|---|
| Roll Coating or Trailing Blade | 48% to 55%, by weight, solids |
| Air Knife | 28%, to 32%, by weight, solids |

The coated paper sheets were then air dried and subjected to a plurality of tests to determine their ability to perform in the transfer-mark-forming record media products. The final formulations contain the following components on a solids basis:

| Component | Weight Parts (grams) | Percent by Weight |
|---|---|---|
| Condensate(s) | 1700 | 17.0 |
| "Tamol 731" (dispersant) | 51 | 0.5 |
| Kaolin clay | 5450 | 54.5 |
| Calcium carbonate | 900 to 1200 | 9.0 to 12.00 |
| "Syloid 72" | 300 (when employed) | .0 to 3.0 |
| "Dow Latex 620" | 650 | 6.5 |
| "Penford Gum 260" | 950 | 9.5 |

Each product sheet differing in phenolic resin is subjected to two tests (Typewriter Print Intensity and Wall Fade Resistance) and rated comparatively, the lowest quality product receiving a "7" and the highest quality product receiving a "1" for each of the product tests.

The test sheets were assembled for the Typewriter Print Intensity test by placing the condensate-coated paper sheet (condensate up) beneath a paper sheet having its bottom surface coated with capsules ("CB" sheet) containing a solution of basic chromogenic material (prepared, for example, in accordance with Example 8) with two plain bond paper sheets as "back-up" sheets underneath the condensate-coated sheet. The test was conducted by inserting the assembly in an "IBM Secretary" typewriter using a four bar cross hatch character at a pressure setting of 5 and typing six rows of cross hatch approximately three inches long. Then, using an opacimeter, the color intensity of the marked portion ("I") was read, along with the color intensity of the unmarked background ("$I_o$"). Specific Typewriter Intensity was obtained by dividing "I" by "$I_o$".

The Wall Fade Resistance test is conducted by exposing sheets wherein the capsules were ruptured and color produced by typewriter and taking opacimeter readings of "I" and "$I_o$" initially and after three weeks' exposure to normal ambient room conditions with the test samples mounted on a wall. Diminution of mark color intensity over the three-week period is indicative of the extent of fading.

The comparative results are tabulated below:

| Run | Condensate(s) | Typewriter Intensity | Resistance to wall fade |
|---|---|---|---|
| "A" | p-chloro phenol/formaldehyde | 1 | 1 |
| "B" | condensate of formaldehyde with 3:1 molar mixture of p-chloro phenol and p-1,1,3,3-tetramethyl butyl phenol, respectively | 2 | 2 |
| "C" | condensate of formaldehyde and 2:1 molar mixture of the p-substituted phenols of Run "B" | 3 | 3 |
| "D" | condensate of formaldehyde and 1:1 molar mixture of the p-substituted phenols of Run "B" | 4 | 4 |
| "E" | p-t-butyl phenol/formaldehyde | 5 | 5 |
| "F" | p-1,1,3,3-tetramethyl butyl phenol/formaldehyde | 6 | 6 |

The object in producing a high-quality product having a balanced combination of advantageous properties is to optimize its Typewriter Intensity and Wall Fade Resistance without seriously degrading resistance to yellowing and print speed decline. While the measurements for Typewriter Intensity and Resistance to Wall Fade appear to dictate use of p-halo phenol-formaldehyde condensates alone, the use of p-alkyl substituted phenol-formaldehyde condensates allows attainment of enhanced resistance to yellowing and resistance to print speed decline; viz., the maintenance of rate of print development once capsule rupture occurs regardless of length of storage before use. Also, use of the p-alkyl phenols enables economies to be realized, as they are less expensive than the p-halo phenols.

EXAMPLE 7

(Coating formulation for transfer-mark-forming paper using a "trimer plus" condensate of formaldehyde and p-chloro phenol in admixture with a "trimer plus" condensate of formaldehyde and a p-$C_8$-alkyl-substituted phenol. This condensate mixture can, of course, also be used in self-contained mark-forming record media.)

Three hundred and forty grams of a "trimer plus" condensate of formaldehyde and p-chloro phenol, 1,360 grams of a "trimer plus" condensate of formaldehyde and p-1,1,4,4-tetramethyl butyl phenol, 1,700 grams of water, and 204 grams of a 25 percent, by weight, aqueous Tamol 731 solution were charged into a 2-gallon attritor about two thirds filled with ⅛-inch-diameter stainless steel balls. The aqueous mixture was ground for 75 to 90 minutes at 180 revolutions per minute.

Then 5,500 grams of kaolin clay, 900 to 1,200 grams of calcium carbonate, and 300 grams of Syloid 72 were dispersed in approximately 6,000 grams of water, using a Cowles Dissolver (or other suitable high-speed agitator). Dispersing agents (for example, tetra sodium phosphate) can be used, as desired, to assist in obtaining smooth, lump-free coatings.

When the above components were properly dispersed, 4,240 grams of the ground "trimer plus" condensate mixture was added to the clay-containing dispersion, along with 4,750 grams of a 20 percent, by weight, aqueous solution of Penford Gum 260 and 1,300 grams of Dow Latex 620 (50 percent solids). These components were added with continuous stirring. The coating formulation was then applied to paper in accordance with the Example 6 procedure.

EXAMPLE 8

This example illustrates typical preparation of "self-contained" paper record media; viz., where both the basic chromogenic material and the co-reactant "trimer plus" p-substituted phenol/formaldehyde condensate(s) are present on the same side of the same sheet. Basically, this procedure involves depositing a coating containing the previously encapsulated solution of basic chromogenic material upon the paper, followed by application of a top coat containing said condensate(s). When the condensate top coat is applied by aqueous dispersion coating techniques, the structure illustrated by FIG. XIV is attained. When the condensate top coat is applied by solvent coating, the structure illustrated by FIG. XV is obtained.

While the basic chromogenic material can be encapsulated (for example, in solution form) in a variety of ways, as referred to hereinabove, a typical encapsulation procedure is as follows:

Preparation of Capsules Containing Solution of Basic Chromogenic Material

Three grams of Crystal Violet Lactone dye (basic chromogenic material) is dispersed in a combined solvent mixture of 131.5 grams of chlorinated biphenyl (approximately 42 percent, by weight, chlorine) and 65.5 grams of Magnaflux Oil (a low vapor pressure hydrocarbon mixture containing 50 percent, by volume, naphthenes, 49 percent, by volume, paraffins, and 1 percent, by volume, aromatics and having a Kauri-Butanol number of 29.2 as determined by ASTM Procedure D–1133) and heated at 190° F. for 1 hour, with agitation, to dissolve the Crystal Violet Lactone.

Separately, an aqueous gelatin sol containing 9.1 percent, by weight, gelatin is prepared by dissolving 20 grams of high-isoelectric-point pigskin gelatin in 200 grams of deionized water which is agitated and heated at 132° F. for 1 hour to aid solution.

Separately, an aqueous solution containing approximately 5 percent, by weight, of a copolymer of methyl vinyl ether and maleic anhydride is prepared by dissolving 5 grams of said copolymer in 95 grams of deionized water and heating at 190° F. for 1 hour to aid solution. The pH of the solution is then adjusted to 9.0 with an aqueous solution containing 20 percent, by weight, sodium hydroxide.

Separately, an aqueous solution containing approximately 9.1 percent, by weight, gum arabic is prepared by dissolving 15 grams of gum arabic in 150 grams of deionized water, using agitation, and heating at 132° F. for 1 hour to aid in dissolving. Insolubles, if any, can be removed by filtration or decanting.

The pH of the gelatin sol is then adjusted to 6.5 with a 20 percent, by weight, aqueous sodium hydroxide solution, and the gelatin sol is poured into a Blendor or a colloid mill (or equivalent mixing and comminuting device). Two hundred grams of the Crystal Violet Lactone solution is added, and the combined gelatin-Crystal Violet Lactone solutions are emulsified to a droplet size of about 5 microns or less. The pH of the resulting emulsion is then adjusted to 9.0 by use of 20 percent, by weight, aqueous sodium hydroxide.

Then 686 grams of deionized water, 146.6 grams of the gum arabic solution, and 12.5 grams of the copolymer solution are added to said emulsion, and the pH of the total mixture is adjusted to 9.0 with 20 percent, by weight, aqueous sodium hydroxide, with continuous agitation, and heating at 132° F.

Under continued agitation, 18 milliliters of a 14.7 percent, by weight, aqueous acetic acid solution is added gradually over a 25-minute period, resulting in a pH for the total mix in the range of 4.4 to 4.6. The batch is then chilled to 55° F. over a 30-minute period. Ten milliliters of a 25 percent, by weight, glutaraldehyde aqueous solution is then added, and the batch is mixed for one hour. With continuing agitation, 15 grams of said copolymer solution is added at a rate sufficiently slow to retain batch fluidity (usually over a 30-minute period). The pH of the batch is then adjusted to 10 with 20 percent, by weight, aqueous sodium hydroxide. Small amounts of a 20 percent, by weight, aqueous sodium carbonate solution can be used, as desired, to buffer pH. The resultant capsules range in size (diameter) from 5 to 20 microns (the average size ranging between 8 and 10 microns).

BASECOAT

| Component | Weight Parts (grams) |
| --- | --- |
| Aqueous dispersion containing 17.5 % by weight, encapsulated Crystal Violet Lactone solution (as prepared above) | 296 |
| Calcined kaolin clay | 25 |
| Purified wood cellulose fibers (microfine) | 8.8 |
| Medium particle size talc (0% retained on 375-mesh screen) | 3.7 |
| Medium viscosity ethylated corn starch | 38.5 |
| Water | 28 |

The above-tabulated components are mixed for 5 minutes at high speed in a Blendor or a colloid mill to yield a 25 percent, by weight, solids basecoat mix which is coated, with the use of an air knife of a Meyer rod coater, at a rate of 4.9 to 5.1 pounds per ream (500 25-inch by 38-inch sheets) of paper base stock.

TOPCOAT

| Component | Weight Parts (grams) |
| --- | --- |
| Condensate | 140 |
| Water | 703 |
| Gum Arabic | 10 |
| Kaolin Clay | 590 |
| Calcined kaolin | 120 |
| Aqueous Etherized Corn Starch (20% solids) | 400 |
| Carboxylated Styrene-Butadiene Latex | 120 |

The resin topcoat is prepared by milling 140 grams of resin condensate(s), 183 grams of water, and 10 grams of gum arabic in a suitable size attritor (which is two thirds full of stainless steel balls) for 1 hour or for a sufficient time to obtain an average particle size of less than 3 microns; for example, in the range of 1 to 3 microns, as determined by conventional light transmission measurements.

The 590 grams of kaolin clay, 120 grams of calcined kaolin, and 520 grams of water are added to a Blendor (or other suitable high-speed stirring unit) and blended until the clays are dispersed thoroughly. Then 333 grams of the milled resin dispersion (as prepared above) is added and thoroughly mixed with the clay dispersion. Four hundred grams of the 20 percent etherized corn starch is then added with continued stirring, followed by the addition of 120 grams of the carboxylated styrenedbutadiene latex.

The topcoat is then coated (at 30 percent solids) on the previously base-coated paper at a rate of 4.2 ± 0.2 pounds per ream with the use of an air knife or a number 7-wire rod coater. After being dried, the self-contained paper sheets are subjected to a "Self-Contained Test for Typewriter Intensity" and rated comparatively "1" to "4," "1" indicating the highest quality product with respect thereto and "4" indicating the lowest.

The "Self-Contained Test for Typewriter Intensity" is conducted as follows. One self-contained paper sheet is assembled over two plain (15-pound) base paper sheets, and one plain (15-pound) base paper sheet is placed on the top of the self-contained sheet. Using an "IBM Secretary" typewriter (four bar cross hatch), colored marks are printed on the self-contained paper by capsule rupture. Typewriter Intensity is then determined on the self-contained sheet as in Example 6.

The below-tabulated results of the Self-Contained Typewriter Intensity Test illustrate the effect of employing different condensates in the topcoat of self-contained paper record media.

| Run | Condensates | Self-Contained Typewriter Intensity |
| --- | --- | --- |
| "A" | p-1,1,3,3-tetramethyl butyl phenol/formaldehyde | 4 |
| "B" | p-t-butyl phenol/formaldehyde condensate | 3 |
| "C" | condensate of formaldehyde with 3:1 molar mixture of p-chloro phenol and p-1,1,3,3-tetramethyl butyl phenol | 1 |
| "D" | mixture containing 80%, by weight, of condensate of formaldehyde with p-t-butyl phenol and 20%, by weight, of condensate of formaldehyde with a 3:1 molar mixture of p-chloro phenol and mixture of p-chloro phenol and p-1,1,3,3-tetramethyl butyl phenol, respectively | 2 |

What is claimed is:

1. Mark-forming record material comprising sheet material containing two essential color-forming reactants which produce color upon contact with one another in the presence of a mutual liquid solvent wherein
   a. one of said essential color-forming reactants comprises a phenolic resin containing at least 70 percent, by weight, of oil-soluble, amorphous, free-hydroxy-group-containing, room-temperature-solid, thermoplastic, polymeric condensates of formaldehyde and at least two p-substituted phenols of which at least 10 percent, by weight, is a phenol bearing an electron-attracting group in the para-position selected from the group consisting of a p-halophenol, p-nitrophenol, p-carboxyphenol, p-carbalkoxyphenol, p-acylphenol, and p-aroylphenol and not more than 90 percent by weight, is a phenol bearing an electron-donating group in the para-position selected from the group consisting of p—$C_1$ to $C_{12}$-alkyl-substituted phenol, p-benzylphenol, and p-loweralkoxyphenol, said polymeric condensates containing at least three p-substituted phenol units per molecule,
   b. the other essential color-forming reactant comprises a basic chromogenic material which produces color upon contact with (a) in the presence of said mutual liquid solvent, and
   c. said mutual liquid solvent is isolated from at least one of said essential color-forming reactants, in the sheet material, in the form of a plurality of discrete droplets, so that, upon release of said mutual solvent from isolation, a mark is formed in the area of such release.

2. Mark-forming record material according to claim 1, wherein said polymeric condensates are acid-catalyzed polymeric condensates.

3. Mark-forming record material as in claim 2 wherein said p-halo phenol is p-chloro phenol.

4. Mark-forming record material as in claim 2 wherein said p—$C_1$ to $C_{12}$-alkyl substituent is composed chiefly of alkyl groups containing from eight to nine carbon atoms.

5. Mark-forming record material as in claim 4 wherein said p-alkyl substituted phenol is composed chiefly of p-1,1,3,3-tetramethyl butyl phenol.

6. Mark-forming record material as in claim 2 wherein said polymeric condensates are condensates of from about 0.65 to about 1.0 mole of formaldehyde per mole of said p-substituted phenol mixture.

7. Mark-forming record material as in claim 2 wherein said mutual liquid solvent is isolated by confinement in microcapsules having diameters ranging from about 5 to 50 microns and seamless polymeric capsule cell walls.

8. Mark-forming record material as in claim 2 wherein said sheet material is paper.

9. Mark-forming record material as in claim 8 wherein a single paper sheet contains both said essential color-forming reactants.

10. Mark-forming record material as in claim 7 including a plurality of paper sheets, one containing microcapsules containing liquid mutual solvent solution of one of said essential color-forming reactants and another paper sheet containing the other essential color-forming reactant.

11. Mark-forming record material as in claim 10 wherein said other essential color-forming reactant is present as microcapsules containing a liquid mutual solvent solution thereof.

12. Mark-forming record material as in claim 10 wherein said color-forming reactant present as a solution in said microcapsules is said basic chromogenic material.

13. Mark-forming record material as in claim 10 wherein said color-forming reactant present as a solution in said microcapsules is said phenolic resin.

14. Mark-forming record material comprising paper containing two essential color-forming reactants which produce color upon contact with one another in the presence of a mutual liquid solvent wherein
   a. one of said essential color-forming reactants comprises a phenolic resin containing at least 80 percent, by weight, of oil-soluble, amorphous, free-hydroxy-group-containing, room-temperature-solid, thermoplastic, acid-catalyzed, polymeric condensates of formaldehyde with at least two p-substituted phenols of which at least 10 percent, by weight, is p-chlorophenol and not more than 90 percent, by weight, is selected from the group consisting of p—$C_1$ to $C_{12}$-alkyl-substituted phenol, said polymeric condensates containing at least 3 but not more than 12 recurring p-substituted phenol units per molecule,
   b. the other essential color-forming reactant comprises a basic chromogenic material which produces color upon contact with (a) in the presence of said mutual liquid solvent, and
   c. said mutual liquid solvent is present in the form of a profusion of seamless, pressure-rupturable microcapsules containing said mutual solvent and wherein the capsule cell walls of said microcapsules are composed of a polymeric material insoluble in said mutual solvent, wherein said mutual solvent is released upon capsule rupture, thus initiating said color-formation in the areas of paper where capsule rupture occurs.

15. Mark-forming record material as in claim 14 wherein one of said essential color-forming reactants is present as a solution in said mutual solvent within said microcapsules.

16. Mark-forming record material as in claim 15 wherein said other essential color-forming reactant is present as a solution in said mutual solvent within separate microcapsules.

17. Mark-forming record material as in claim 15 wherein a single paper sheet contains both of said essential color-forming reactants.

18. Mark-forming record material as in claim 15 which includes a plurality of paper sheets, one paper sheet containing one of said essential color-forming reactants and another paper sheet containing said other essential color-forming reactant.

19. Mark-forming record material as in claim 15 wherein said one essential color-forming reactant comprises said basic chromogenic material (b).

20. Mark-forming record material as in claim 15 wherein said one essential color-forming reactant comprises phenolic resin (a).

21. Mark-forming record material as in claim 15 wherein said polymeric condensates comprise a mixture containing (I) from about 10 percent to about 35 percent, by weight, of a condensate of from about 0.65 to 1 mole of formaldehyde per mole of
  1. from about 1 to about 5 moles of p-chloro phenol per mole of
  2. a material selected from the group consisting of
    a. p—$C_1$ to $C_{12}$-alkyl-substituted phenol,
    b. p-benzyl phenol, and
    c. p-loweralkoxyphenol,
and (II) from about 65 percent to about 90 percent, by weight, of at least one condensate of from about 0.65 to 1 mole of formaldehyde per mole of a material selected from the group consisting of
  (a) p—$C_1$ to $C_{12}$-alkyl-substituted phenol,
  (b) p-benzyl phenol, and
  (c) p-loweralkoxyphenol.

22. Mark-forming record material as in claim 21 wherein said condensate (II) is composed of predominantly a formaldehyde condensate of p-t-butyl phenol.

23. Mark-forming record material as in claim 21 wherein the p-substituted phenol of (I) (2) (a) is predominantly p-1,1,3,3-tetramethyl butyl phenol.

24. Record sheet material comprising sheet material containing acidic polymeric material which produces color by chemical reaction upon mutual-solution-contact with a basic chromogenic material wherein said acidic polymeric material comprises a phenolic resin containing at least 70 percent, by weight, of oil-soluble, amorphous, free-hydroxy-group-containing, room-temperature-solid, thermoplastic, polymeric condensates of formaldehyde and at least one p-substituted phenol of which at least 10 percent, by weight, is a phenol bearing an electron-attracting group in the para-position selected from the group consisting of p-halophenyl, p-nitrophenol, p-carboxyphenol, p-carbalkoxyphenol, p-acylphenol, and p-aroylphenol, and not more than 90 percent, by weight, is a phenol bearing an electron-donating group in the para-position selected from the group consisting of p—$C_1$ to $C_{12}$-alkyl-substituted phenol, p-benzyl phenol, and p-loweralkoxy phenol, said polymeric condensates containing at least 3 p-substituted phenol units per molecule.

* * * * *